United States Patent Office.

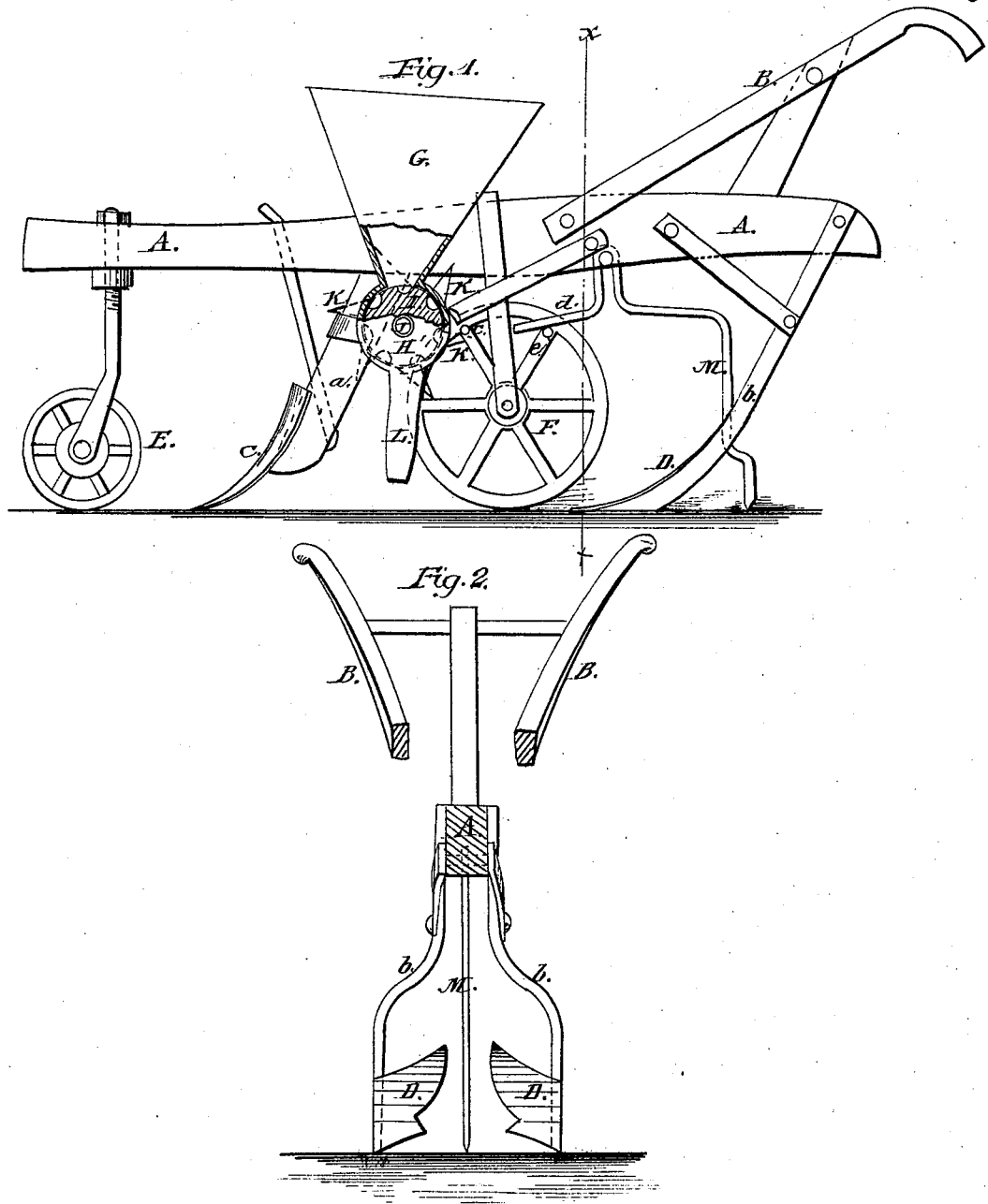

DAVID C. WOODS, OF WAXAHATCHIE, TEXAS.

Letters Patent No. 98,136, dated December 21, 1869.

IMPROVEMENT IN SEED-PLANTERS.

The Schedule referred to in these Letters Patent and making part of the same.

*To all whom it may concern:*

Be it known that I, DAVID C. WOODS, of Waxahatchie, in the county of Ellis, and State of Texas, have invented a new and improved Seed-Planter; and I do hereby declare that the following is a full, clear, and exact description thereof, which will enable others skilled in the art to make and use the same, reference being had to the accompanying drawing, forming part of this specification, in which—

Figure 1 represents a side elevation, partly in section, of my improved corn-planter.

Figure 2 is a vertical transverse section of the same, taken on the plane of the line $x$-$x$, fig. 1.

Similar letters of reference indicate corresponding parts.

This invention has for its object the construction of a seed-planter which will deposit the seeds in the requisite quantities and proper distances apart, and which will cover and mark the hills, so that a plowman will not be at a loss where to start at the commencement of a new row, and after having passed around tree-stumps or other obstructions, as he can always see the marks on the preceding rows.

The invention consists in the arrangement of a device for automatically dropping the seed at certain intervals, by means of a wheel running on the ground and acting upon the rotating dropper, and the general combination of parts for forming an improved seed-planting machine.

A, in the drawing, represents the beam of my planter. This, like a plow-beam, is provided with handles B B, and with three plow-standards, $a$, $b$, and $b$.

The front standard $a$ carries a share, C, for opening the furrow; the two standards $b$ $b$ are in rear and in line with each other, and carry shovels D D, which close the furrow after the seed has been deposited in the same.

The beam A is supported in front by a wheel, E, and between the plows C and D by a wheel, F.

G is the seed-hopper, attached to the beam somewhat behind the standard $a$. It is arranged above a cylindrical chamber, H, within which a drum, I, is mounted on an axle, J, that has its bearings in the ends of the chamber.

In the edge of the drum I are indentations or cavities for the reception of the seed.

On the axle J is mounted a toothed disk, K, which is on the outside of the case H.

On the outer face of the wheel F is arranged a projecting pin, $c$, which, once during every revolution of the said wheel, strikes one arm or tooth of the disk K, and turns the same, and with it the drum I. Intermittent rotary motion is thus imparted to the drum.

At every move, a cavity is brought under the hopper to be filled, and another discharged into the tube L, by which the seed for one hill is deposited in the furrow made by the plow C.

It is evident that if desired, the wheel F may be provided with more than one stop $c$.

M is a wire or other rod, pivoted to the under side of the beam A, and provided with an arm, $d$, which extends forward to be struck by a pin or pins, $e$, projecting from the inner face of the wheel F, there being as many pins $e$ as there are $c$.

When the pin $e$ strikes the arm $d$, it elevates the same, and forces the lower end of the rod M into the ground behind the shovels D, for the purpose of marking the hill last covered.

The rod is then, by its own weight, or by means of a suitable spring, raised out of the ground to clear the ground, until it is again struck by one or the pin $e$, to mark the next hill.

Having thus described my invention,

What I claim as new, and desire to secure by Letters Patent, is—

1. The combination of the wheel F, which has te stop $c$, with the toothed disk K and seed-dropper I, all arranged, substantially as described, to automatically drop certain quantities of seed at certain intervals, as specified.

2. The improved seed-planter formed by the combination, with the beam A, of the wheel E, shovel C, hopper G, seed-dropper I, toothed disk K, wheel F, marker M, shovels D, and handles B, when said parts are arranged as shown and described.

DAVID C. WOODS.

Witnesses:
W. W. McCANDLESS,
C. C. PEARSON.